United States Patent
Kashima et al.

[11] Patent Number: 5,481,393
[45] Date of Patent: Jan. 2, 1996

[54] PUPIL MODULATION OPTICAL SYSTEM

[75] Inventors: Shingo Kashima; Shinichi Hayashi, both of Tokyo, Japan

[73] Assignee: Olympus Optical Co., Ltd., Tokyo, Japan

[21] Appl. No.: 149,335

[22] Filed: Nov. 9, 1993

[30] Foreign Application Priority Data

Nov. 9, 1992 [JP] Japan ................... 4-298551

[51] Int. Cl.$^6$ .............. G02B 26/02; G02B 5/22
[52] U.S. Cl. .............. 359/227; 359/385; 359/885
[58] Field of Search .................. 359/227, 229, 359/232, 237, 238, 240–242, 244, 308, 368, 369, 385, 389, 738–740, 559, 562, 885, 889

[56] References Cited

U.S. PATENT DOCUMENTS 4,832,446  5/1989  Miyagawa ................... 359/559

FOREIGN PATENT DOCUMENTS 62-212617  9/1987  Japan.
63-28723   6/1988  Japan.

Primary Examiner—James Phan
Attorney, Agent, or Firm—Cushman, Darby & Cushman

[57] ABSTRACT

A pupil modulation optical system which enables pupil modulation modes to be readily changed over from one to another and makes it possible to readily form an image of high resolution and high contrast. The optical system has a condenser lens (1) and an objective lens (2). Intensity modulation filters (3) and (4) for pupil modulation are disposed at at least two different pupil positions or positions equivalent to pupils of the optical system. By controlling the intensity distributions of the filters (3) and (4), various pupil modulation effects, e.g., contrast increasing effect, resolution improving effect, are obtained.

4 Claims, 5 Drawing Sheets

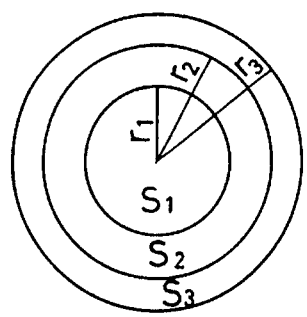
FIG. 2
FIG. 3
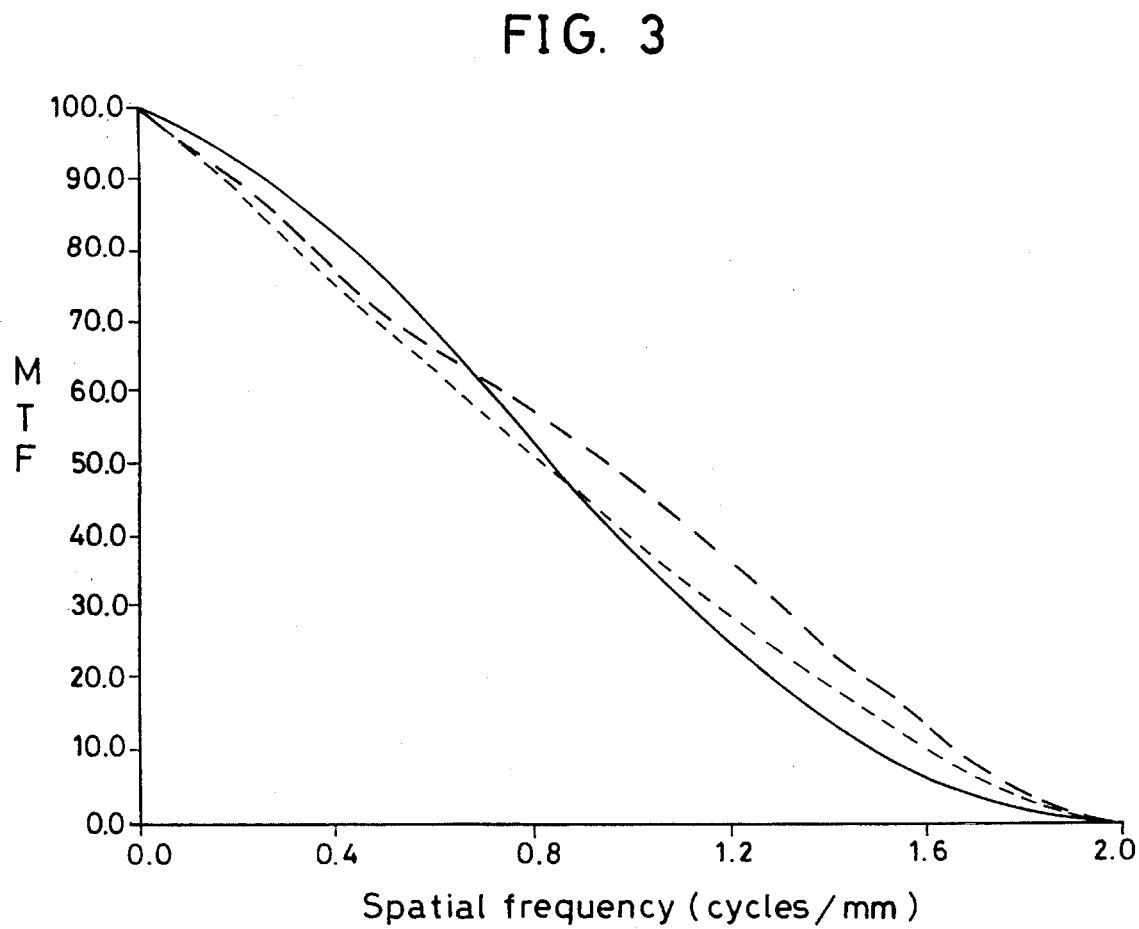

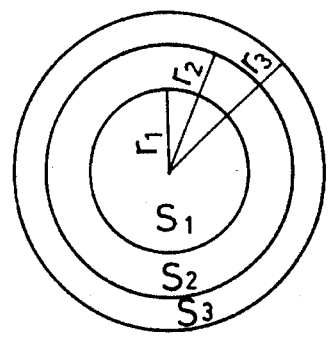
FIG. 4
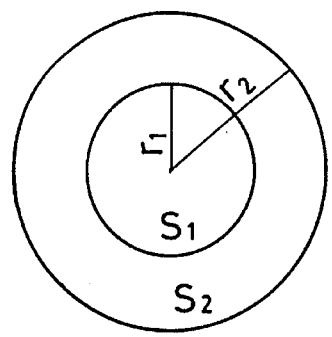
FIG. 5
FIG. 6
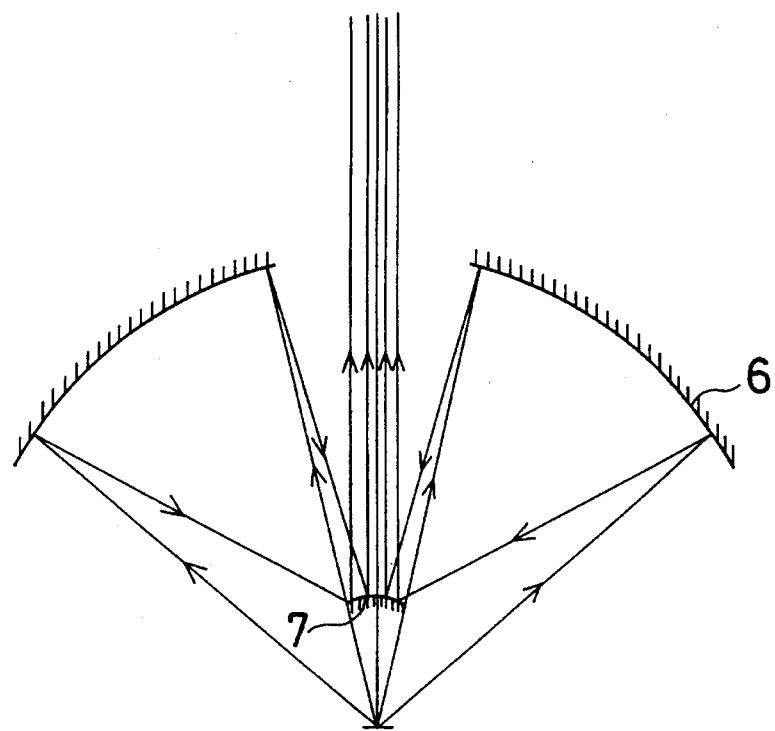

PUPIL MODULATION OPTICAL SYSTEM

BACKGROUND OF THE INVENTION

The present invention relates to a pupil modulation optical system and, more particularly, to a pupil modulation optical system used in the optical system of a microscope or the like to improve the image quality by increasing contrast and improving resolution.

As devices which are similar to the pupil modulation optical system of the present invention, ordinary circular obscured aperture and apodization filters have heretofore been known: for example, see Japanese Patent Application Laid-Open (KOKAI) No. 62-212617 (1987) and Japanese Patent Application Post-Exam Publication No. 03-81129 (1991).

In any of the above-described ordinary circular obscured aperture and apodization filters, pupil modulation is effected at only one position (a pupil position of an objective or condenser lens) in the optical system. Therefore, the effect of pupil modulation is fixed, and various pupil modulation effects cannot readily be obtained. That is, it is not easy to change over observation modes, i.e., observation with high contrast, and observation with high resolution, in accordance with each particular specimen. In Japanese Patent Application Laid-Open (KOKAI) No. 62-212617 (1987) also, pupil modulation is effected at only one position, and the effect thereof is manifest only when the intensity distribution of incident light is a Gaussian distribution. In Japanese Patent Application Post-Exam Publication No. 03-81129 (1991), a circular obscured aperture is provided at a pupil position of a condenser lens, and intensity modulation and phase modulation are effected at a pupil position of an objective lens, thereby realizing high resolution and high contrast. However, the production of a phase modulation filter is difficult, and various pupil modulation effects cannot readily be changed over with the arrangement described above.

SUMMARY OF THE INVENTION

In view of the above-described problems of the background art, it is an object of the present invention to provide a pupil modulation optical system which enables various pupil modulation effects to be readily changed over from one to another and also makes it possible to readily form an image of high resolution and high contrast.

To attain the above-described object, the present invention provides a pupil modulation optical system wherein pupil modulation is effected by controlling the intensity distribution at at least two positions equivalent to pupils of the optical system.

In addition, the present invention provides a pupil modulation optical system having an imaging optical system and an illuminating optical system. The pupil modulation optical system includes a device for effecting pupil modulation by controlling intensity distribution at a pupil position or a position equivalent to a pupil of the imaging optical system, and a device for effecting pupil modulation by controlling intensity distribution at a pupil position or a position equivalent to a pupil of the illuminating optical system.

It is well known that MTF (Modulation Transfer Function), when pupil modulation is made by effecting intensity control at a pupil position of an objective lens, for example, can readily be obtained by computation on the basis of autocorrelation of the pupil function. MTF reveals that when a circular obscured aperture is used, MTF at low frequency is relatively low, while MTF at high frequency is relatively high. That is, the contrast falls, while the resolving power rises. If apodization is effected (i.e., the intensity in the center of the pupil is made higher than that at the periphery thereof), MTF at low frequency is relatively high, while MTF at high frequency is relatively low. That is, the contrast rises while the resolving power falls.

MTF, when pupil modulation is also effected at a pupil position of a condenser lens in addition to the pupil modulation at an objective lens, is obtained by multiplying the above-described autocorrelation function by the intensity distribution at the pupil of the condenser lens. The effect obtained by pupil modulation effected only at the pupil position of the condenser lens is substantially the same as in the case of the objective lens. However, by combining together the pupil modulation carried out for the objective lens and that for the condenser lens (for example, pupil modulation filters for the condenser lens are changed over from one to another), it is possible to readily change over observation modes, i.e., high-contrast observation, ordinary observation, and high-resolution observation, and it is also possible to realize high resolving power and high contrast at the same time by properly scheming the intensity distributions of intensity modulation filters and combination of these filters so as to minimize the intensity difference between zero-order diffracted light and first-order diffracted light.

In addition, since all the pupil modulations are effected by intensity control, modulation filters used therefor are easy to produce and less costly.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 2 shows one example of the transmittance distribution of a modulation filter for an objective shown in FIG. 1.

FIG. 3 is a graph showing MTF of the optical system shown in FIG. 1.

FIG. 4 shows one example of the transmittance distribution of a modulation filter for a condenser lens shown in FIG. 1.

FIG. 5 shows another example of the transmittance distribution of the modulation filter for the condenser lens shown in FIG. 1.

FIG. 6 shows the arrangement of a reflecting objective of the typical two-surface reflection type.

DESCRIPTION OF THE PREFERRED EMBODIMENTS

One embodiment of the pupil modulation optical system according to the present invention will be described below with reference to the accompanying drawings.

Figure 1A:
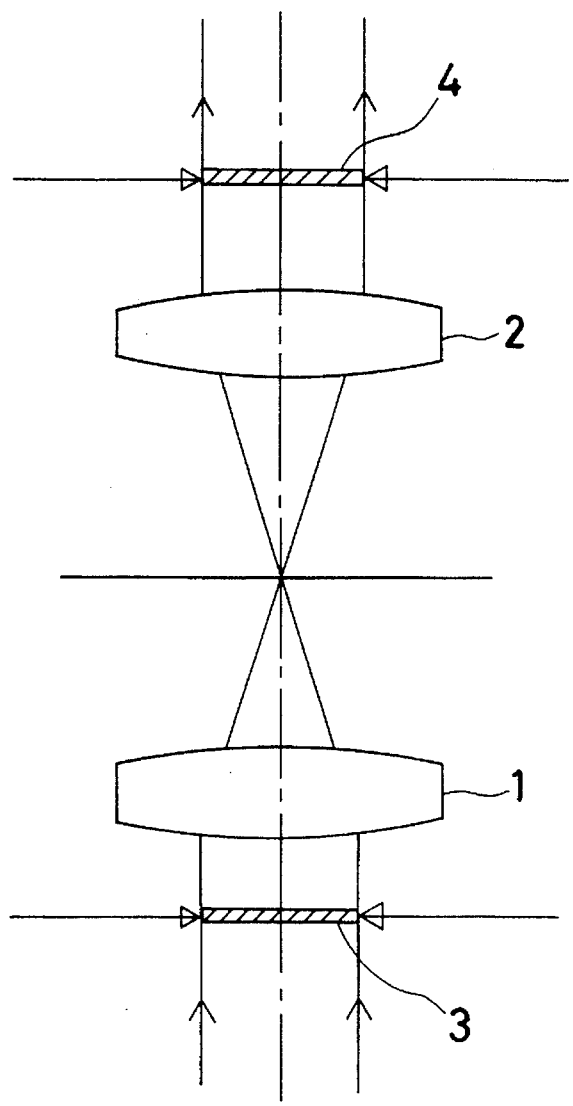
FIG. 1 illustrates one embodiment of the pupil modulation optical system according to the present invention, in which the general arrangement of the embodiment is shown at FIG. 1(a), and one example of a turret used in a condenser section is shown at FIG. 1(b).
Figure 1B:
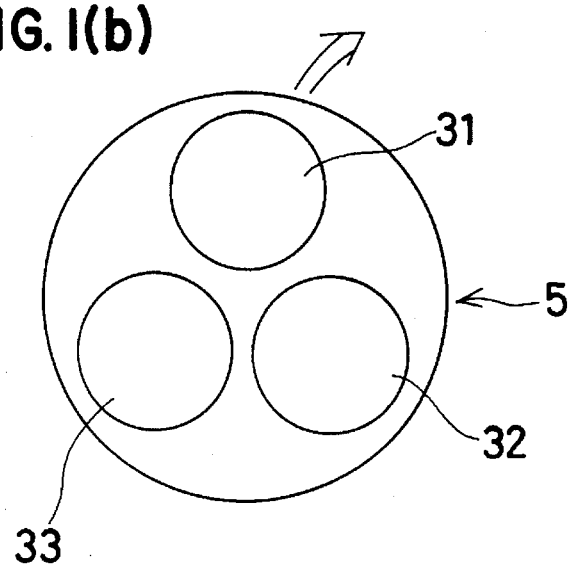

FIG. 1 illustrates one embodiment of the present invention, in which the general arrangement of the embodiment is shown in FIG. 1(a), and one example of a turret used in the condenser section is shown in FIG. 1(b). The optical system includes a condenser lens 1 for illumination and an objective lens 2, which have respective filters 3 and 4 for pupil modulation. The filter 3 is disposed at a position equivalent to a pupil of the condenser lens 1, while the filter 4 is disposed at a pupil position of the objective lens 2. As shown in FIG. 1(b), the pupil modulation filter 3 of the condenser lens 1 is a filter selected from among a plurality of filters 31 to 33, i.e. filters A-31, B-32, or C-33, attached to a turret 5 such that these filters 31 to 33 are exchangeable by rotation of the turret 5. FIG. 2 shows one example of the transmittance distribution of the modulation filter 4 disposed at the pupil position of the objective lens 2, as shown in FIG. 1. The modulation filter 4 shown in FIG. 1 has a transmittance distribution in which the transmittance is the highest in the center and gradually lowers toward the periphery, that is, the transmittance changes stepwise, as shown in FIG. 2. It should be noted that the change of transmittance may be continuous. In FIG. 2, $r_k$, K=1, 2, 3, represents the radius of each annular zone when the radius of the pupil is defined as 1. This $r_1$=0.5, $r_2$=0.8, and $r_3$=1.0 and $S_k$, K=1, 2, 3, is a region sandwiched between $r_k$ and $r_{k-1}$ ($r_0$ represents the center of the pupil). In addition, $\tau(S_k)$ represents the transmittance of the region $S_k$. The transmittance of the region $S_1$, $S_2$, and $S_3$ is $\tau(S_1)$=100%, $\tau(S_2)$=50%, and $\tau(S_3)$= 25%. The filter shown in FIG. 2 is a 3-step apodization filter in which the transmittance becomes higher toward the center. The MTF using the filter 4 is shown by the solid line in the graph of FIG. 3. As will be understood from the graph, the contrast is relatively high, but the resolution is relatively low. Thus, the filter 4 is suitable for a case where a relatively large specimen is desired to be observed with high contrast. FIGS. 4 and 5 show examples of the transmittance distribution of the modulation filter 3 disposed at a position equivalent to the pupil of the condenser lens 1. As shown in FIGS. 4 and 5, the transmittance is the lowest in the center and gradually becomes higher toward the periphery, that is, the transmittance changes stepwise. In FIG. 4, $r_1$=0.5, $r_2$=0.8, and $r_3$1.0, while $\tau(S_1)$=25%, $\tau(S_2)$=50%, and $\tau(S_3)$=100%. In FIG. 5, however, $r_1$=0.55 and $r_2$=1.0, while $\tau(S_1)$=0% and $\tau(S_2)$= 100. If the modulation filter 3 shown in FIG. 4 is used in combination with the filter 4, the MTF becomes approximately equal to the ordinary MTF, as shown by the dotted line in FIG. 3. If the modulation filter 3 shown in FIG. 5 is used in combination with the filter 4, high-resolution observation can be made, as shown by the broken line in FIG. 3. Thus, the combination of the filters 3 and 4 is suitable for observation of a small specimen. These filters are adapted to be exchangeable by using a turret 5 or the like. An illuminating light source (not shown) is disposed below the filter 3 shown in FIG. 1(a). Thus, a microscope can be constructed in which a specimen, which is to undergo microscopic observation, is illuminated by the light source through the condenser lens 1, and a microscopic image of the specimen is observed through the objective lens 2.

With the above-described system, it is possible to select any of the observation modes, i.e., high-contrast observation, ordinary observation, and high-resolution observation, simply by changing the filter 3 for the condenser lens 1, using a single objective lens 2.

Figure 7:
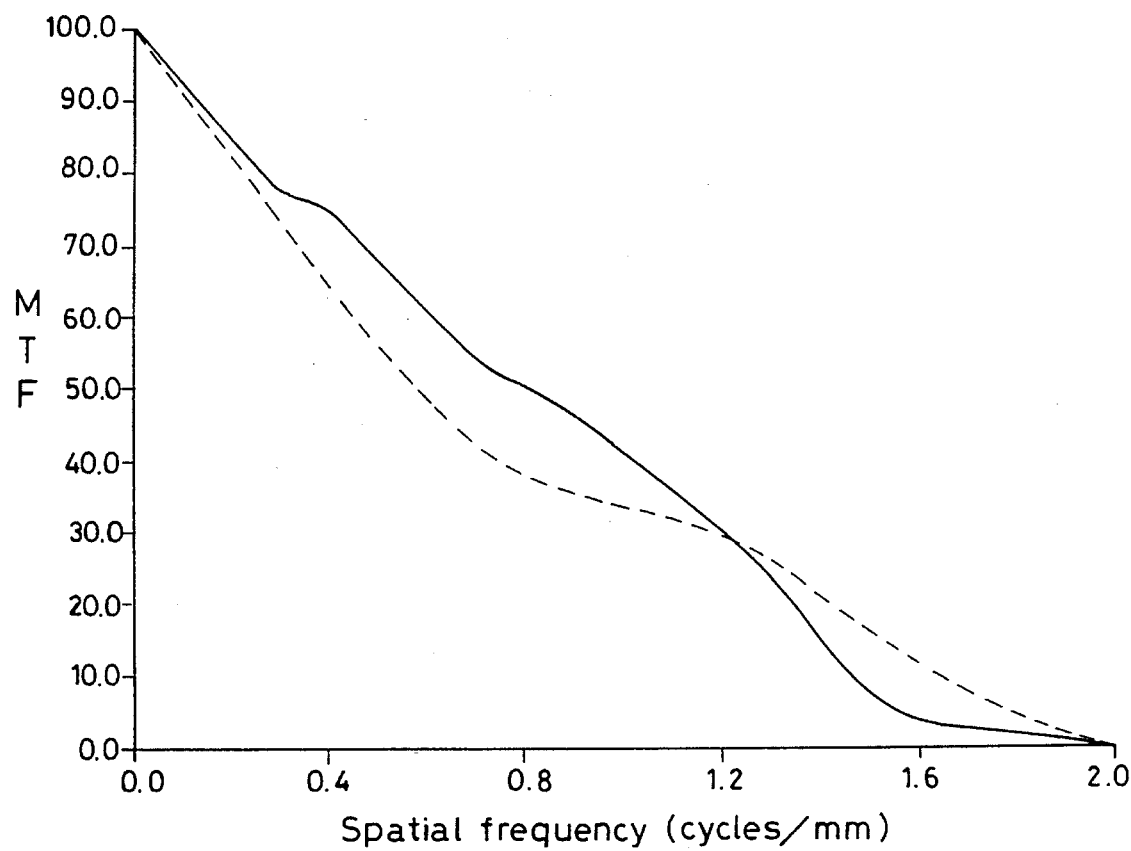
FIG. 7 is a graph showing MTF of an optical system including the reflecting objective shown in FIG. 6.
Figure 8:
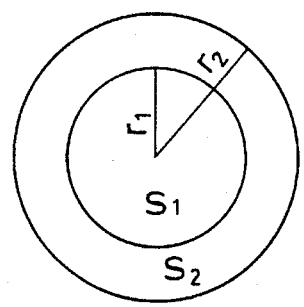
FIG. 8 shows one example of the transmittance distribution of a modulation filter for a condenser lens.

FIG. 6 shows a reflecting objective of the typical two-surface reflection type which has a main mirror 6 and a sub-mirror 7. Because of its arrangement, the reflecting objective has a circular obscured aperture which is formed by the main mirror 6 and the sub-mirror 7, and it has MTF such as that shown by the broken line in FIG. 7 due to the action of the circular obscured aperture. As will be understood from the graph of FIG. 7, the resolution is relatively high, but the contrast is relatively low. Accordingly, the image obtained by the reflecting objective is not favorable. If the reflecting objective is combined with a condenser lens 1 having a pupil modulation filter 3 with a transmittance distribution as shown in FIG. 8 where $r_1$=0.6, $r_2$=1.0 and $\tau(S_1)$=100% and $\tau(S_2)$=10%. The MTF at low frequency rises, as shown by the solid line in FIG. 7. Thus, the contrast can be improved. It should be noted that since the sub-mirror 7 of the reflecting objective lies at a position equivalent to a pupil of the objective, pupil modulation can be effected by controlling the intensity distribution of the sub-mirror 7. The control of the intensity distribution of the sub-mirror 7 may be effected by changing the reflectivity of the sub-mirror 7, for example. In this case, the sub-mirror 7 preferably has a reflectivity distribution in which the reflectivity is the highest in the center and gradually lowers toward the periphery. The reflectivity may change either continuously or stepwisely.

Figure 9:
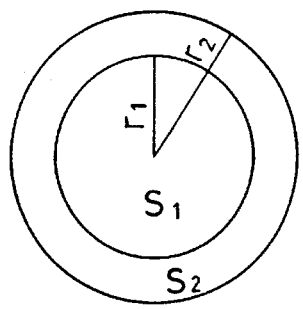
FIG. 9 shows another example of the transmittance distribution of a modulation filter for a condenser lens.
Figure 10:
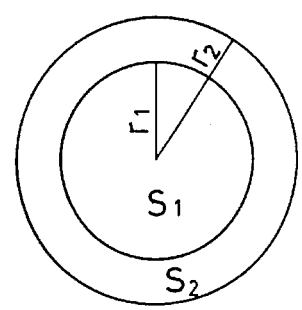
FIG. 10 shows another example of the transmittance distribution of a modulation filter for an objective.
Figure 11:
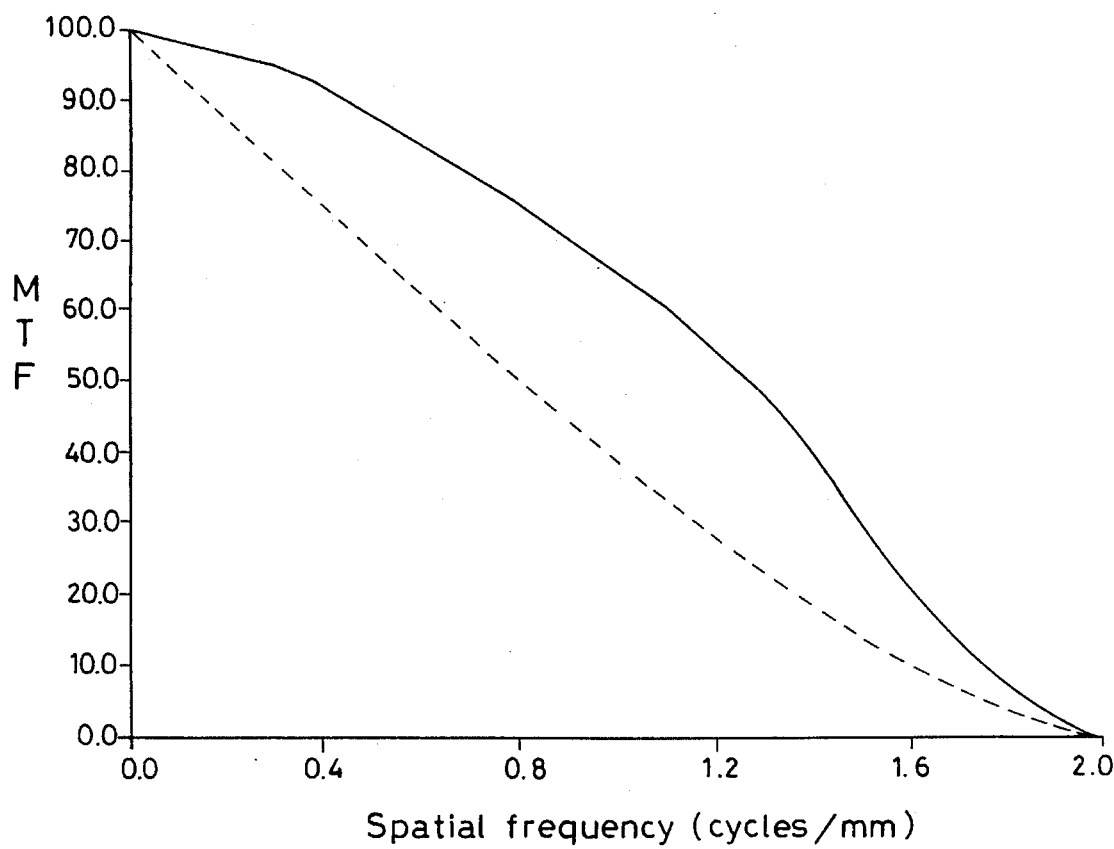
FIG. 11 is a graph showing MTF of an optical system including the condenser lens having the modulation filter shown in FIG. 9 and the objective having the modulation filter shown in FIG. 10.

FIGS. 9 and 10 respectively show transmittance distributions of pupil modulation filters 3 and 4 for a condenser lens 1 and an objective lens 2 for obtaining high resolution and high contrast. The filter 3 for the condenser lens 1 serves as a circular obscured aperture, while the filter 4 for the objective lens 2 serves as an apodization filter, and these filters 3 and 4 are given transmittance distributions as shown in FIGS. 9 and 10. In FIG. 9, $r_1$= 0.7 and $r_2$=1.0, while $\tau(S_1)$=0% and $\tau(S_2)$=100%. In FIG. 10, $r_1$=0.7 and $r_2$=1.0 while $\tau(S_1)$=100% and $\tau(S_2)$=20%. Thus, it is possible to obtain MTF such as that shown by the solid line in FIG. 11. It should be noted that the chain line in FIG. 11 shows ordinary MTF.

Although the pupil modulation optical system of the present invention has been described by way of embodiments, it should be noted that the present invention is not necessarily limited to these embodiments and that various changes and modifications may be imparted thereto. It should also be noted that an optical system to which the idea of the present invention is applicable is not necessarily limited to one which includes a condenser lens and an objective lens as shown in FIG. 1 and that the present invention can be applied to various optical systems in which an image is transmitted by connecting an entrance pupil and an exit pupil.

As will be clear from the foregoing description, the pupil modulation optical system of the present invention enables various pupil modulation effects, e.g., contrast increasing effect, resolution improving effect, etc., to be obtained and allows these effects to be readily changed over from one to another by using a combination of at least two intensity modulation filters which are disposed at respective positions equivalent to pupils of the optical system.

What we claim is:

1. An optical system having a plurality of pupils, said optical system comprising:

a first filter means for controlling intensity distributions without effecting phase modulation of light at one of a plurality of positions for said pupils;

a second filter means for controlling intensity distributions without effecting phase modulation of light at another of said plurality of positions for pupils;

wherein said first and second filter means further perform pupil modulation at said one and another positions of said plurality of positions for said pupils of the optical system.

2. An optical system according to claim 1, wherein said means for performing pupil modulation is provided with a plurality of filters selectively insertable into an optical path of the optical system.

3. A pupil modulation optical system having an imaging optical system and an illuminating optical system, said pupil modulation optical system comprising:

first means for performing pupil modulation by controlling a first intensity distribution without effecting phase modulation at at least one of a pupil position and a position equivalent to a pupil of said imaging optical system; and second means for performing pupil modulation by controlling a second intensity distribution without effecting phase modulation at at least one of a pupil position and a position equivalent to a pupil of said illuminating optical system.

4. A pupil modulation optical system according to claim 3, wherein at least one of said first means and said second means for performing pupil modulation is provided with a plurality of filters selectively insertable into an optical path of the pupil modulation optical system.

* * * * *